US012688647B2

(12) United States Patent
Mizushima et al.

(10) Patent No.: US 12,688,647 B2
(45) Date of Patent: Jul. 21, 2026

(54) RISK ANALYSIS APPARATUS, VIRTUAL MODEL GENERATION APPARATUS, METHOD, AND COMPUTER READABLE MEDIUM

(71) Applicant: NEC Corporation, Tokyo (JP)

(72) Inventors: Ryo Mizushima, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 18/568,907

(22) PCT Filed: Jun. 15, 2021

(86) PCT No.: PCT/JP2021/022697
§ 371 (c)(1),
(2) Date: Dec. 11, 2023

(87) PCT Pub. No.: WO2022/264265
PCT Pub. Date: Dec. 22, 2022

(65) Prior Publication Data
US 2024/0282052 A1      Aug. 22, 2024

(51) Int. Cl.
*G06F 21/10* (2013.01)
*G06T 17/00* (2006.01)

(52) U.S. Cl.
CPC .................................. *G06T 17/00* (2013.01)

(58) Field of Classification Search
CPC ...... G06F 21/577; G06F 21/552; G06F 21/57; G06F 21/55; G06F 21/554; G06F 21/56; G06F 21/606; G06F 21/604; G06F 21/62; G06F 2221/034; G06T 17/00
See application file for complete search history.

(56) References Cited

U.S. PATENT DOCUMENTS

2020/0244693 A1*  7/2020  Ghorbani ............ H04L 63/1433

FOREIGN PATENT DOCUMENTS

| | | |
|---|---|---|
| JP | 2012-043013 A | 3/2012 |
| JP | 2015-191390 A | 11/2015 |
| JP | 2020-052686 A | 4/2020 |
| WO | 2015/177832 A1 | 11/2015 |
| WO | 2021/059521 A1 | 4/2021 |

OTHER PUBLICATIONS

International Search Report for PCT Application No. PCT/JP2021/022697, mailed on Sep. 7, 2021.

* cited by examiner

*Primary Examiner* — Hau H Nguyen
(74) *Attorney, Agent, or Firm* — Sughrue Mion, PLLC

(57) ABSTRACT

Grouping means groups a plurality of hosts included in a system to be analyzed into a plurality of groups each including one or more hosts. The grouping means uses measure-related information including information related to measures planned for the system to be analyzed to group the plurality of hosts into the plurality of groups. Virtual analysis element generation means generates a virtual analysis element for each of the plurality of groups. Virtual model generation means generates a virtual model used for risk analysis that includes the virtual analysis elements generated by the virtual analysis element generation means. Analysis means analyzes the risks included in the system to be analyzed using the virtual model generated by the virtual model generation means.

12 Claims, 5 Drawing Sheets

RISK ANALYSIS APPARATUS, VIRTUAL MODEL GENERATION APPARATUS, METHOD, AND COMPUTER READABLE MEDIUM

This application is a National Stage Entry of PCT/JP2021/022697 filed on Jun. 15, 2021, the contents of all of which are incorporated herein by reference, in their entirety.

TECHNICAL FIELD

The present disclosure relates to a risk analysis apparatus, a risk analysis method, a virtual model generation apparatus, a virtual model generation method, and a computer readable medium.

BACKGROUND ART

In recent years, the threat of cyberattacks has not only occurred in the ICT (Information and Communication Technology) field, but also in the control systems and Internet of Things (IoT) fields. In particular, in the control systems field, there have been incidents that threaten the operation of critical infrastructure, such as the shutdown of power systems and factories. To address the threat of cyberattacks, it is important to clarify the security risks inherent in these systems and implement measures to reduce the risks.

In security risk analysis, several attack scenarios are considered. Attack scenarios may include potential entry points for attacks, the final target of the attack, and the type of final attack. The security risk analysis apparatus refers to configuration information about a system and other relevant data to deduce attack procedures based on attack conditions in an inferential manner, and explore attack paths for these scenarios. A graph that represents attack procedures in attack paths and conditions for the attack procedures in a graphical format is referred to as an "attack graph" or "attack tree".

In related art, Patent Literature 1 discloses a security measure decision support apparatus. In Patent Literature 1, the system targeted for security measures is assumed to be a complex and large-scale power supply system, which has a plurality of servers including a server for information management, subsystems, and terminals. During the development of power supply systems, security experts conduct risk analysis based on data flow diagrams of the target system and plan security measures. The security measure decision support apparatus is used to assist in planning security measures.

CITATION LIST

Patent Literature

Patent Literature 1: International Patent Publication No. WO2015/177832

SUMMARY OF INVENTION

Technical Problem

In the process of planning security measures, it is necessary to conduct detailed risk analysis to analyze what risks exist in the system. However, it is difficult to conduct detailed risk analysis when the system is large. For example, when detailed risk analysis is conducted on office computers, the calculation workload becomes immense as the number of computers increases. On the other hand, if a plurality of office computers with similar configurations are consolidated into a single unit for detailed risk analysis, it is possible to reduce the calculation workload. However, this approach may not consider factors such as the presence of terminals that cannot be addressed by measures, and may result in incorrect plan of security measures based on a risk analysis result.

Patent Literature 1 has a problem that, when there are a large number of hosts in a system to be analyzed, the calculation cost required for generating an attack tree becomes enormous in risk analysis performed on the basis of a data flow diagram. Therefore, there is a desire to enable appropriate plan of measures against risks while suppressing calculation costs in risk analysis.

In view of the above, one of the objects of the present disclosure is to provide a risk analysis apparatus, a risk analysis method, a virtual model generation apparatus, a virtual model generation method, and a computer readable medium which enable appropriate plan of measures against risks while suppressing calculation costs in risk analysis, even for complex systems.

Solution to Problem

In order to achieve the above object, the present disclosure provides a risk analysis apparatus as a first example aspect. The risk analysis apparatus includes: grouping means for grouping a plurality of hosts included in a system to be analyzed into a plurality of groups each including one or more hosts using measure-related information including information related to measures planned to address risks included in the system; virtual analysis element generation means for generating one or more virtual analysis elements for each of the plurality of groups; virtual model generation means for generating a virtual model used for risk analysis, the virtual model including the generated virtual analysis elements; and analysis means for analyzing the risks included in the system to be analyzed using the virtual model.

The present disclosure provides a virtual model generation apparatus as a second example aspect. The virtual model generation apparatus includes: grouping means for grouping a plurality of hosts included in a system to be analyzed into a plurality of groups each including one or more hosts using measure-related information including information related to measures planned to address risks included in the system; virtual analysis element generation means for generating one or more virtual analysis elements for each of the plurality of groups; and virtual model generation means for generating a virtual model used for risk analysis, the virtual model including the generated virtual analysis elements.

The present disclosure provides a risk analysis method as a third example aspect. The risk analysis method includes: grouping a plurality of hosts included in a system to be analyzed into a plurality of groups each including one or more hosts using measure-related information including information related to measures planned to address risks included in the system; generating one or more virtual analysis elements for each of the plurality of groups; generating a virtual model used for risk analysis, the virtual model including the generated virtual analysis elements; and analyzing the risks included in the system to be analyzed using the virtual model.

The present disclosure provides a virtual model generation method as a fourth example aspect. The virtual model generation method includes: grouping a plurality of hosts included in a system to be analyzed into a plurality of groups each including one or more hosts using measure-related information including information related to measures planned to address risks included in the system; generating one or more virtual analysis elements for each of the plurality of groups; and generating a virtual model used for risk analysis, the virtual model including the generated virtual analysis elements.

The present disclosure provides a computer readable medium as a fifth example aspect. The computer readable medium storing a program for causing a computer to execute processing of: grouping a plurality of hosts included in a system to be analyzed into a plurality of groups each including one or more hosts using measure-related information including information related to measures planned to address risks included in the system; generating one or more virtual analysis elements for each of the plurality of groups; generating a virtual model used for risk analysis, the virtual model including the generated virtual analysis elements; and analyzing the risks included in the system to be analyzed using the virtual model.

The present disclosure provides a computer readable medium as a sixth example aspect. The computer readable medium storing a program for causing a computer to execute processing of: grouping a plurality of hosts included in a system to be analyzed into a plurality of groups each including one or more hosts using measure-related information including information related to measures planned to address risks included in the system; generating one or more virtual analysis elements for each of the plurality of groups; and generating a virtual model used for risk analysis, the virtual model including the generated virtual analysis elements.

Advantageous Effects of Invention

A risk analysis apparatus, a risk analysis method, a virtual model generation apparatus, a virtual model generation method, and a computer readable medium according to the present disclosure enable appropriate plan of measures against risks while suppressing calculation costs in risk analysis.

EXAMPLE EMBODIMENT

Figure 1:
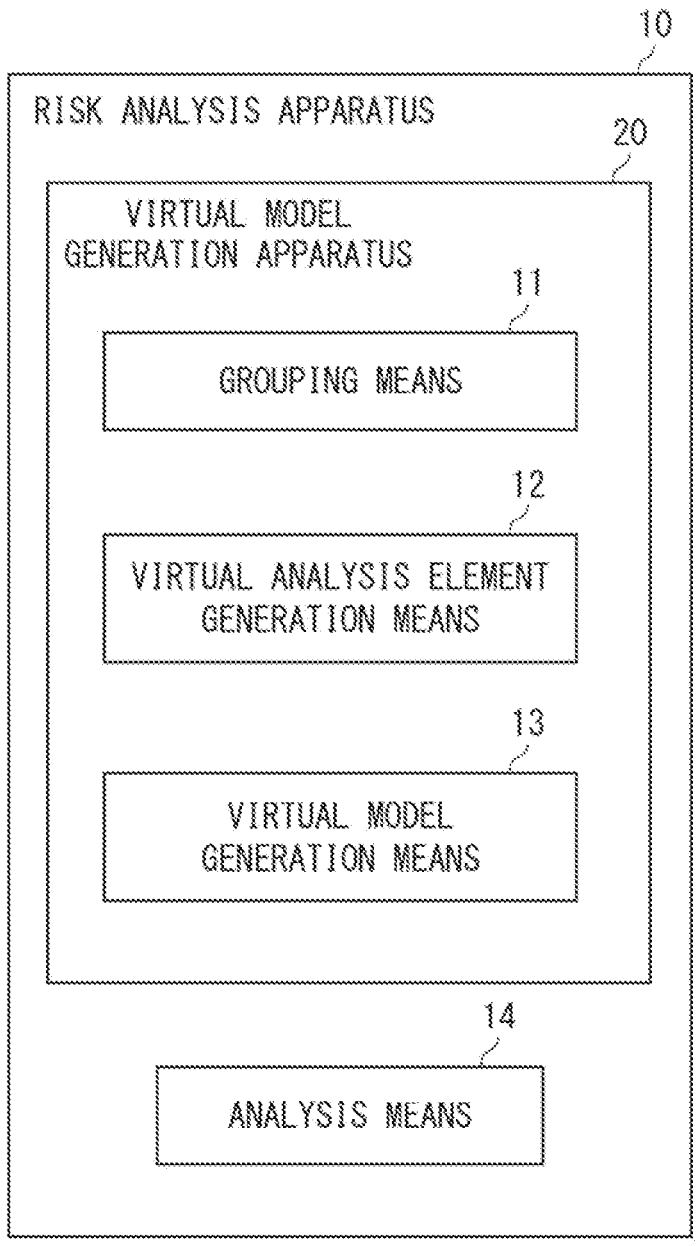
FIG. 1 is a block diagram showing a risk analysis apparatus according to the present disclosure.

Prior to the description of example embodiments of the present disclosure, an outline of the present disclosure will be described. FIG. 1 shows a risk analysis apparatus according to the present disclosure. The risk analysis apparatus 10 includes grouping means 11, virtual analysis element generation means 12, virtual model generation means 13, and analysis means 14. In the risk analysis apparatus 10, the grouping means 11, the virtual analysis element generation means 12, and the virtual model generation means 13 constitute a virtual model generation apparatus 20. The virtual model generation apparatus 20 generates an analytical model (virtual model) used for risk analysis.

The grouping means 11 groups a plurality of hosts included in a system to be analyzed into a plurality of groups, each containing one or more hosts. In the present disclosure, the grouping means 11 uses measure-related information, which includes information related to measures planned for the system to be analyzed, to group the plurality of hosts into the plurality of groups. The virtual analysis element generation means 12 generates one or more virtual analysis elements for each of the plurality of groups.

The virtual model generation means 13 generates a virtual model to be used for risk analysis. The virtual model includes one or more virtual analysis elements of each group generated by the virtual analysis element generation means 12. The analysis means 14 analyzes risks included in the system to be analyzed using the virtual model generated by the virtual model generation means 13.

In the present disclosure, the grouping means 11 groups a plurality of hosts into a plurality of groups using the measure-related information. The virtual analysis element generation means 12 generates a virtual analysis element for each group, and the virtual model generation means 13 generates a virtual model including a virtual analysis element. The analysis means 14 analyzes risks included in the system to be analyzed using the virtual model. In the present disclosure, risk analysis is conducted using the virtual model including the virtual analysis element of the grouped hosts. Therefore, the calculation cost of risk analysis can be suppressed. In the present disclosure, a virtual model (virtual analysis element) is generated taking into account measures to be planned. Therefore, when measures are planned using the analysis results of the analysis means 14, planning of measures can be appropriately performed.

Example embodiments of the present disclosure will be described in detail below. The following descriptions and drawings have been omitted and simplified as appropriate for clarity of explanation. In the following drawings, the same elements and similar elements have the same reference numerals, and repeated explanations have been omitted as necessary.

Figure 2:
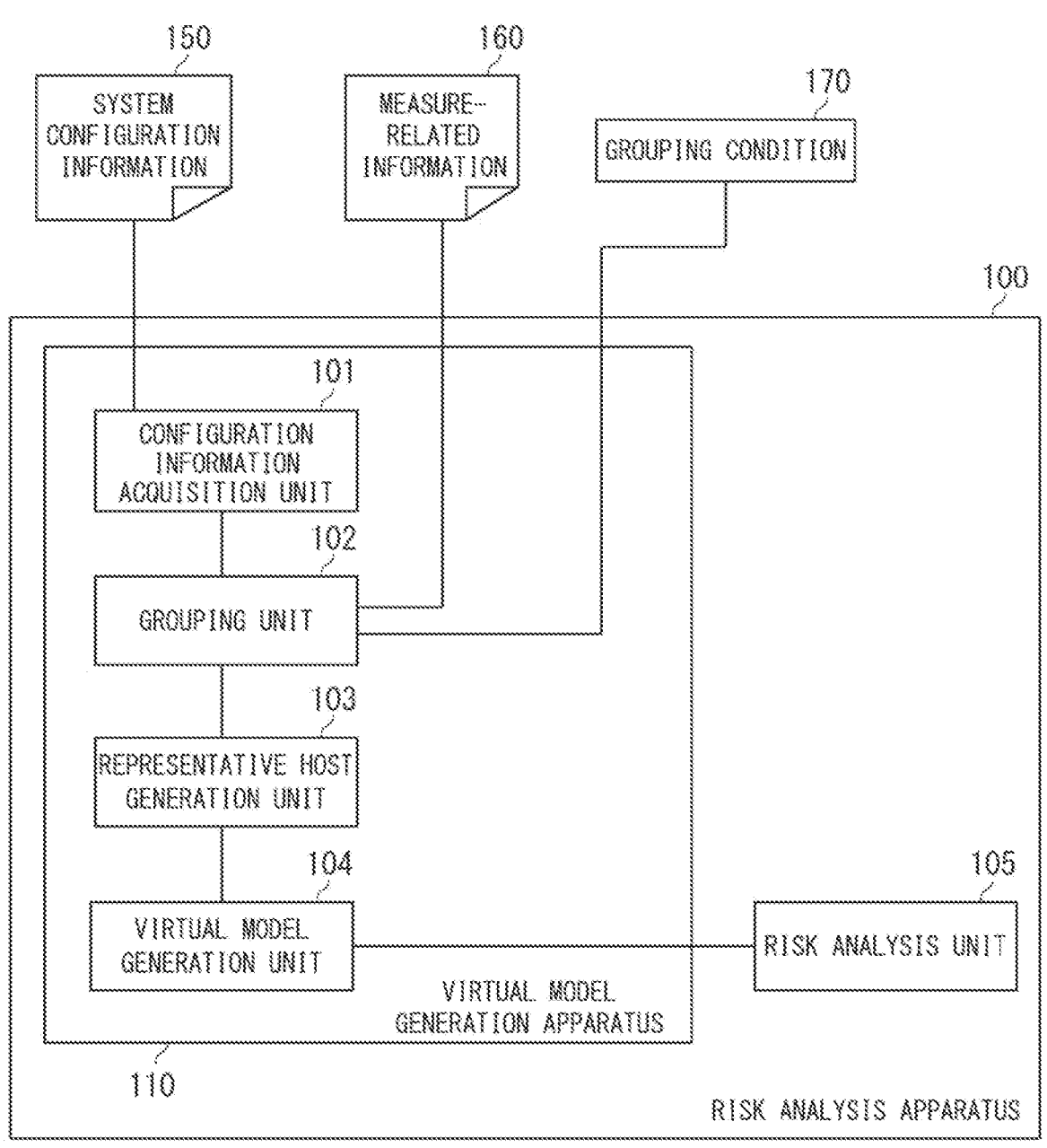
FIG. 2 is a block diagram showing a risk analysis apparatus according to an example embodiment of the present disclosure.

FIG. 2 shows a risk analysis apparatus according to an example embodiment of the present disclosure. A risk analysis apparatus 100 includes a configuration information acquisition unit 101, a grouping unit 102, a representative host generation unit 103, a virtual model generation unit 104, and a risk analysis unit 105. In the risk analysis apparatus 100, the configuration information acquisition unit 101, the grouping unit 102, the representative host generation unit 103, and the virtual model generation unit 104 constitute a virtual model generation apparatus 110. The risk analysis apparatus 100 corresponds to the risk analysis apparatus 10 shown in FIG. 1. The functions of each unit in the risk analysis apparatus 100 may be implemented, for example, by a computer apparatus performing processing according to a program. The virtual model generation apparatus 110 corresponds to the virtual model generation apparatus 20 shown in FIG. 1.

The configuration information acquisition unit 101 collects system configuration information 150. The system configuration information 150 includes, for example, information about hosts and information about connections between hosts. The information about hosts includes, for example, information such as Internet Protocol (IP) addresses, subnet masks, host firewall settings, installed software, Operating System (OS) (including version), operation services, available port numbers, presence of Universal Serial Bus (USB) ports, and vulnerability information. The information about hosts also includes information about host types, presence of user operations, and credential information held. The "host types" include, for example, general Personal Computers (PCs), routers, firewalls, file servers, active directory servers, and Domain Name Server (DNS) servers. Information about connections between hosts includes information such as network firewall settings and data flow information. The "data flow information" includes information such as "file sharing between hosts A and B using SMB (Server Message Block)" and "in an operation, transferring files from a host C to a host D using a USB memory device".

The measure-related information 160 includes information related to measures that can be planned based on the analysis results of security risks. The measure-related information 160 includes, for example, at least one of time information, management information, operation information, and functional performance information. The time information includes information about time related to measures. The time information includes, for example, the operating time of the host, the frequency of measures, and the time required for measures. The management information includes information about the management of the host. The management information includes, for example, information about the vendor, the management department, and the location (site) where the host is installed.

The operation information includes information about the operation of the host. The operation information includes, for example, information related to whether or not administrator privileges can be disabled and whether or not USB memory devices can be used. The functional performance information includes information about the function and performance of the hosts. The functional performance information includes, for example, information about the available capacity of the hard disk drive (HDD), the memory capacity, the central processing unit (CPU) performance, the maintenance support expiration date for the OS or software, and the availability of rack space.

A grouping condition 170 specifies a condition under which the grouping unit 102 groups hosts. The grouping condition 170 specifies, for example, information and its value from the measure-related information 160 that the grouping unit 102 uses for grouping. The user can input the grouping condition 170 to the risk analysis apparatus 100 by operating an input device such as, for example, a keyboard, a mouse, and a touch panel.

Using the system configuration information 150, the measure-related information 160, and the grouping condition 170, the grouping unit 102 groups the plurality of hosts included in the system into a plurality of groups each including one or more hosts. For example, the grouping unit 102 groups the plurality hosts with similar configurations of the system configuration information 150 and the measure-related information 160 meets the criteria specified in the grouping condition 170 into the same group.

The grouping unit 102 groups, for example, as a first stage, the hosts based on the system configuration information 150. For example, the grouping unit 102 groups the hosts for each subnetwork in the first stage. The subnetwork to which each host belongs can be determined based on address information. The grouping unit 102 acquires the IP address of each host from the system configuration information 150, and determines that the hosts with matching network addresses belong to the same subnetwork. The grouping unit 102 groups the hosts belonging to the same subnetwork into the same group.

Alternatively, the grouping unit 102 may group the hosts within predetermined boundaries in the network, for example, ranges separated by security boundaries. For example, the grouping unit 102 may group the hosts by a network range separated by a firewall. For example, the grouping unit 102 groups the hosts based on the IP address and host type included in the system configuration information 150. The grouping unit 102 may determine that hosts with matching network addresses in the IP addresses belong to the same subnetwork. The grouping unit 102 extracts the hosts having a plurality of IP addresses and groups the hosts in the subnetwork connected by a host whose host type is not a firewall, for example, a router or a host having a plurality of network interface cards (NICs), into the same group.

Further, the grouping unit 102 may group the hosts based on the roles assigned to the hosts, such as office PCs, file servers, log servers, step servers, control servers, or HMI (Human Machine Interface). For example, the grouping unit 102 acquires the host type of each host from the system configuration information 150. The grouping unit 102 may group hosts having the same host type into the same group.

The grouping unit 102 may group hosts based on the configuration of each host. The grouping unit 102 may group hosts based on, for example, any combination of information included in the system configuration information 150. For example, the grouping unit 102 may group a plurality of hosts with the same installed OS and software into the same group. The grouping unit 102 may group the hosts based on the information manually input by the user. The above grouping techniques may be appropriately combined.

As a second stage, the grouping unit 102 divides at least some of the plurality of groups grouped using the system configuration information 150 into a plurality of groups (subgroups) using the measure-related information 160. In this second stage, the grouping unit 102 uses the measure-related information 160 and the grouping condition 170 to divide the groups into those whose measure-related information 160 meets the grouping condition 170, and those whose measure-related information 160 does not meet the grouping condition 170. When a plurality of conditions are set in the grouping condition 170, the grouping unit 102 may divide each group into a plurality of groups based on different combinations of conditions. The grouping unit 102 corresponds to the grouping means 11 shown in FIG. 1.

The representative host generation unit 103 generates one or more virtual analysis elements for each of the plurality of groups grouped by the grouping unit 102. In this example embodiment, the representative host generation unit 103 generates one or more representative hosts as virtual analysis elements. The representative host is a virtual host representing one or more hosts belonging to a group. The representative host generation unit 103 generates the grouping condition (combinations thereof) of each group as the virtual analysis element. The representative host generation unit 103 corresponds to the virtual analysis element generation means 12 shown in FIG. 1.

There are several possible methods for generating the representative host. As a first method, the representative host generation unit 103 may merge attackable elements contained in the system configuration information 150 of one or more hosts belonging to the same group and use the merged attackable elements as the attackable elements of the representative host. The attackable elements contained in the system configuration information 150 include, for example, operation service (available port number), presence of USB port, vulnerability information, presence of user operations, credential information held, and data flow information. The "operation service" includes, for example, network services such as SSH (Secure Shell), FTP (File Transfer Protocol), telnet (Teletype network), and SMB (Server Message Block).

During the generation of the representative host, the representative host generation unit 103 can appropriately rewrite information about the host to that of the representative host. For example, in the data flow information, the representative host generation unit 103 can rewrite each host to the representative host of the group to which it belongs. For example, the information "file sharing between hosts A and B using SMB" may be rewritten to the information "file sharing between the representative host of the group to which the host A belongs and the representative host of the group to which the host B belongs using SMB".

Similarly, in host firewall information and network firewall information, the representative host generation unit 103 can rewrite the information about each host to the information about the representative host of the group to which the host belongs. For example, assume that an IP address of the host A is "192.168.10.1" and an IP address of the host B is "192.168.20.1". Assume that the firewall information is "allow communication from 192.168.10.1 to 192.168.20.1 on TCP port 22". Assume that an IP address of a representative host of a group to which the host A belongs is "192.168.10.100" and that an IP address of a representative host of the group to which the host B belongs is "192.168.20.100". In this case, the representative host generation unit 103 can rewrite the firewall information as "allow communication from 192.168.10.100 to 192.168.20.100 on TCP port 22".

The representative host generation unit 103 may use the IP address and the host type of any host selected from among the plurality of hosts belonging to the same group as the IP address and host type of the representative host. Alternatively, the representative host generation unit 103 may use dummy values as the IP address and host type of the representative host. The representative host generation unit 103 may merge the IP addresses and host types of the hosts within the group.

As a second method, the representative host generation unit 103 may acquire the attackable elements of each host from the system configuration information 150 and generate a representative host based on the number of attackable elements. The representative host generation unit 103 may select one or more hosts having a large number of attackable elements from among the hosts belonging to the same group and generate a host having the same configuration as that of the selected host as the representative host. For example, the representative host generation unit 103 may select a host having the largest number of attackable elements in each group. Alternatively, the representative host generation unit 103 may select one or more hosts having a predetermined number or more of attackable elements in each group. The representative host generation unit 103 may generate a representative host based on the number of specific attackable elements such as the number of pieces of the vulnerability information or the number of operation services.

As a third method, the representative host generation unit 103 may select one or more hosts belonging to the same group that have attackable elements from among hosts of other groups, and generate a host having the same configuration as that of the selected host as the representative host.

The representative host generation unit 103 may specify a host having elements that can be attacked from hosts of other groups based on, for example, the data flow information, the host firewall information, and the network firewall information contained in the system configuration information 150.

As a fourth method, the representative host generation unit 103 may generate a representative host for each host having elements that can be attacked leading to each end point state of partitioning analysis when the risk analysis is conducted using a method of partitioning analysis. Here, the partitioning analysis refers to analyzing the risk of the whole system by dividing the whole system into predetermined units, conducting risk analysis for each partitioned unit, and then combining the risk partition results of the respective partitioned units. The representative host generation unit 103 holds, for example, a table indicating which end point state of the partitioning analysis is reached for each analysis element. The representative host generation unit 103 refers to the held table and system configuration information 150, and determines which end point state each host has.

The methods of generating a representative host described above can be appropriately combined. For example, when a plurality of hosts are selected in the third method, the representative host generation unit 103 may merge elements that can be composed of the selected plurality of hosts according to the first method or the second method, or may further select a host with many elements that can be attacked.

The virtual model generation unit 104 uses the system configuration information 150 and the virtual host generated by the representative host generation unit 103 to generate a virtual model representing the system to be analyzed. The virtual model generation unit 104 corresponds to the virtual model generation means 13 shown in FIG. 1.

The risk analysis unit 105 uses the representative host included in the generated virtual model to analyze potential risks included in the system. The risk analysis unit 105 deduces attack procedures in an inferential manner for each of several assumed attack scenarios and explores an attack path. The attack scenario includes an entry point used for the attack, a final target of the attack, and a type of the final attack. When an attack is started from a representative host of a group to which the host of the entry point used for the attack belongs, the risk analysis unit 105 analyzes whether the attack indicated by the type of the final attack is possible at the representative host of the group to which the host of the attack target belongs.

In this example embodiment, the risk analysis unit 105 can conduct risk analysis using, for example, a method of partition analysis. For a pair of representative hosts included in the virtual model, the risk analysis unit 105 analyzes whether it is possible to transition from each state of the representative host serving as a starting point to each state of the representative host as an ending point. The risk analysis unit 105 combines the results of the partitioning analysis and analyzes whether the attack indicated by the type of the final attack is possible in the representative host which is the final target of the attack when the attack is started from the representative host which is the entry point used for the attack. The risk analysis unit 105 outputs the result of the risk analysis to, for example, a display apparatus (not shown). The risk analysis unit 105 corresponds to the analysis means 14 shown in FIG. 1.

Figure 3:
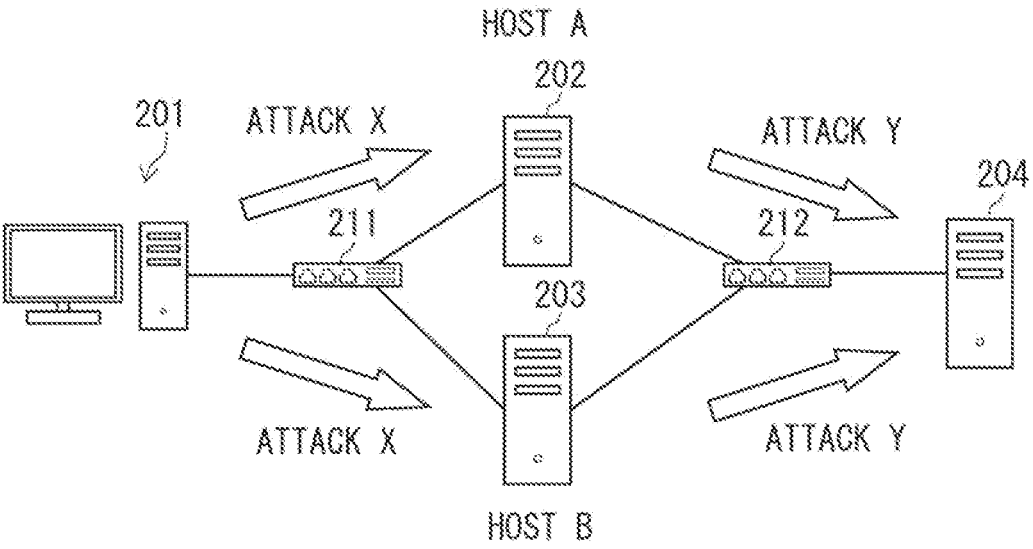
FIG. 3 is a schematic diagram showing a part of an example of a system to be analyzed.

FIG. 3 shows a part of an example of the system to be analyzed. In this example, the system to be analyzed includes an office PC 201, a host A202, a host B203, and a server 204. The office PC 201 is connected to the host A202 and the host B203 via network switch 211. The server 204 is connected to the host A202 and the host B203 via the network switch 212. Assume that an attack using an attack X is possible from the office PC 201 to each of the host A202 and the host B203. Assume that an attack using an attack Y is possible from each of the host A202 and host B203 to server 204.

Figure 4:
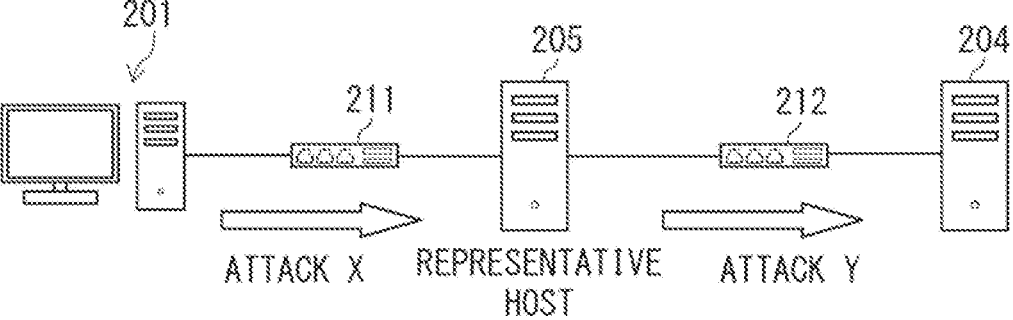
FIG. 4 is a schematic diagram showing a part of an example of a virtual model.

FIG. 4 shows a part of an example of a virtual model generated by the virtual model generation unit 104. Here, it is assumed that the grouping unit 102 groups the hosts A202 and B203 shown in FIG. 3 into the same group. The representative host generation unit 103 generates a representative host 205 corresponding to the hosts A202 and B203 as a virtual analysis element. In this case, in the risk analysis using the virtual model, it is analyzed that an attack using the attack X is possible from the office PC 201 (the representative host representing it) to the representative host 205, and an attack using the attack Y is possible from the representative host 205 to the server 204 (the representative host representing it).

In the above case, since two hosts A202 and B203 are replaced by one representative host 205, the calculation cost in the risk analysis can be reduced. However, when the measures that can be taken to reduce risks differ depending on the host, analyzing two hosts as a single representative host can make it difficult to consider appropriate measures. For example, in FIG. 3, it is assumed that the host A202 can take a certain measure to reduce risks, such as applying a patch, while the host B203 cannot take such a measure. In such a case, after discussing which measure to take, if it is determined, in accordance with the results of the risk analysis based on the virtual model shown in FIG. 4, to apply a patch, which measure the host B203 cannot take, an appropriate measure cannot be planned.

For example, if the host is operating for 24 hours, the host cannot take a measure until the next scheduled stop date and time. Alternatively, if the contractual agreement specifies that measures can only be implemented once a year, measures cannot be implemented until the next time measures are taken. Measures that require OS updates on network switches may necessitate network to be stopped, which may not be allowed in certain situations. In addition, a host physically located at a remote location, such as a dam deep in the mountainous area, may take a long time to implement the measure due to the time required for physical access. For measures that require the introduction of a security product, such as a virtual patch, the host may not meet the system requirements of the security product and may not allow the introduction thereof. Alternatively, some hosts may lack available rack space, making it impossible to add additional equipment for measures. If a plurality of hosts are replaced with one representative host without considering the above circumstances, appropriate measures cannot be considered by referring to the risk analysis results using the representative host.

In this example embodiment, the grouping unit 102 groups the hosts using the system configuration information 150 in the first stage, and further groups the hosts using the measure-related information 160 and the grouping condition 170 in the second stage. For example, in the grouping condition 170, the user can specify a condition where hosts are grouped into different groups based on whether they require a large amount of work to be done for measures, such as physical construction work, and hosts that do not require such work. Alternatively, the user can specify a condition for grouping hosts based on their operating time, such as grouping hosts that can accept temporary measures and hosts that can accept permanent measures.

As the management information, the user can specify a vendor, a management department, or a location (distance between sites) where each host is installed as a condition for grouping. In addition, as the functional performance information, the user can specify a memory capacity, an available HDD capacity, the possibility of introducing a specific protocol, or an OS type as a condition for grouping. As the operation information, the user can use the information about whether or not administrator privileges can be disabled and whether or not USB memory devices can be used as a condition for grouping. For example, the grouping unit 102 divides the hosts grouped by subnets in the first stage into those that satisfy the specified condition, and those that do not in the second stage.

In this example embodiment, the representative host generation unit 103 generates a representative host representing hosts in each group, and the virtual model generation unit 104 generates a virtual model including the generated representative host. The risk analysis unit 105 conducts risk analysis using the generated virtual model. Since hosts are grouped based on the measure-related information 160 and the grouping condition 170 in this embodiment, representative hosts are generated based on the measures that can be taken. Therefore, by using the risk analysis results for representative hosts to consider measures, appropriate measures can be planned for each host.

The user can, for example, avoid planning measures involving stopping the host operating 24 hours that cannot be stopped. In addition, the user can plan different measures for a host that requires time for measures and a host that does not. For example, the user can avoid planning measures including encryption for a host that has insufficient memory capacity to implement encryption. The user can avoid planning measures including log management for a host that has insufficient HDD capacity. The user can avoid planning measures including introduction of a specific protocol for a host that does not support the protocol. The user can avoid planning measures including disabling the administrator privileges for a host that cannot disable the administrator privileges due to operational constraints. In addition, the user can avoid planning measures including prohibiting the use of a USB device for a host that requires data transfer by a USB memory.

Specifically, it is assumed that the host A202 shown in FIG. 3 is a host that is updated once a year, for example, on April 1 of each year, the OS of the host A202 is Windows Server 2016, and the operation service of the host A202 is SMB. The vulnerability of the host A202 is assumed to be discovered on or after April 1. In addition, it is assumed that the host B203 is updated once a year, for example, on April 1 every year, the OS of the host B202 is Windows Server 2016, and the operation services of the host A202 are SMB and SSH. It is assumed that the vulnerability of the host B203 is assumed to be discovered on or after April 1.

In the above case, it is assumed that the host A202 and the host B203 are grouped into the same group, and the representative host 205 shown in FIG. 4 is generated. Assume that the configuration of the representative host 205 is a merged configuration of the configurations of the hosts A202 and B203. When risk analysis is conducted using the representative host 205, the number of threat analyses is reduced, and thus the calculation cost of risk analysis can be reduced.

As another example, assume that the host A202 is as described above, but the host B203 is a host that can be updated at any time. If a critical vulnerability is discovered on May 1, the host A202 cannot be patched, but the host B203 can be patched. Suppose that, without considering the applicability of the patch, the hosts A202 and B203 are combined into one representative host 205, as shown in FIG. 4. In this case, when considering measures based the risk analysis result using the representative host 205, it will actually be discussed whether or not to apply a patch that cannot be applied to the host A202.

When the possibility of patch application is considered, a representative host corresponding to the host A202 and a representative host corresponding to the host B203 are generated. In this case, for the host A202 which cannot have patches applied, alternative measures other than patch application are considered. For the host B203, if a measure to apply a patch is planned and the patch is actually applied, attacks on the host B203 can be prevented.

In the above scenario, consider the case where risk analysis is conducted on April 2. Both the host A202 and the host B203 have undergone annual updates on April 1, and at the time of April 2nd, it can be assumed that both hosts have the same number of vulnerabilities. Therefore, it is unlikely that measures including updates will be planned based on the results of the risk analysis. In this case, the user can take into account the elapsed time since the last update. If not much time has passed since the last update, the user may allow the grouping unit 102 to perform grouping without taking into account the update status. For example, in the grouping condition 170, the user sets a threshold for the elapsed time since the last update. When the elapsed time exceeds the threshold, the grouping unit 102 may perform grouping taking into account whether the update is possible, and when the elapsed time is less than or equal to the threshold, it may perform grouping without taking into account whether the update is possible.

Figure 5:
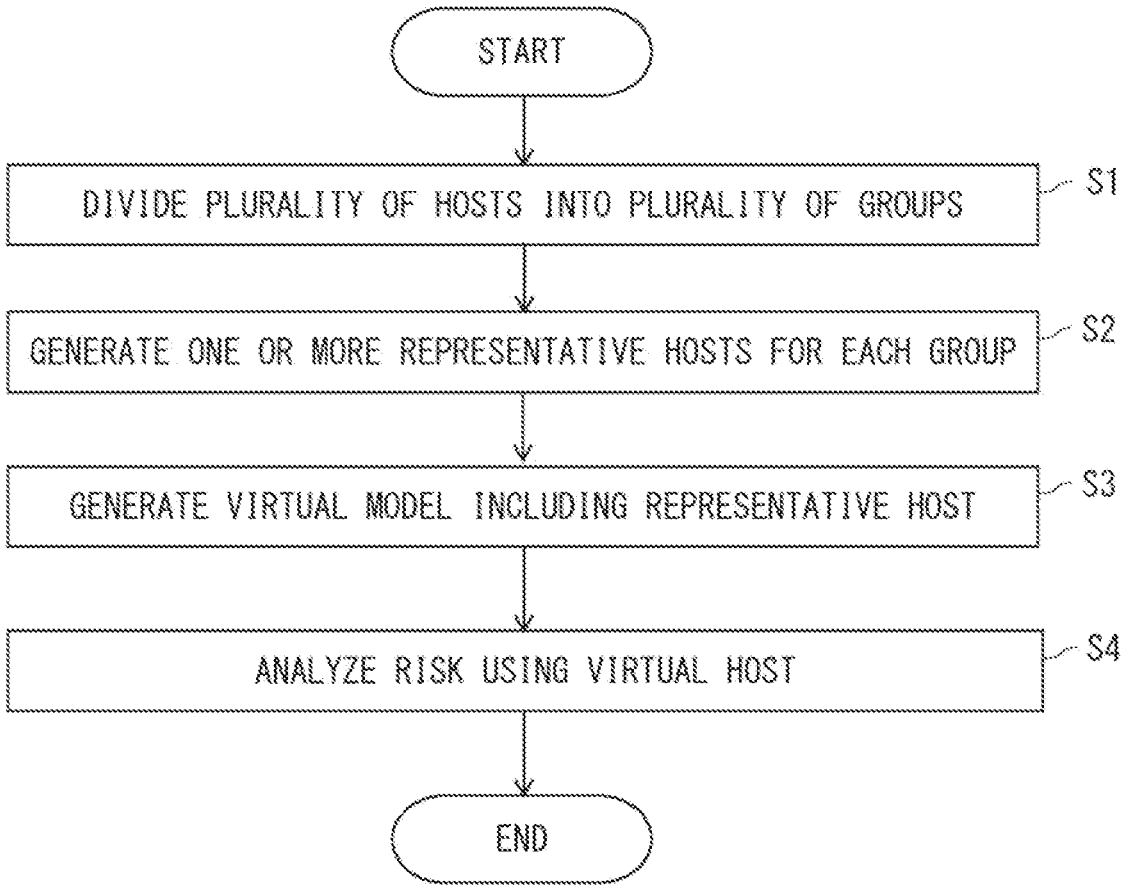
FIG. 5 is a flowchart showing an operation procedure of the risk analysis apparatus.

Next, an operation procedure will be described. FIG. 5 shows the operation procedure of the risk analysis apparatus 100 (i.e., risk analysis method). The configuration information acquisition unit 101 acquires the system configuration information about the system to be analyzed. The grouping unit 102 divides a plurality of hosts included in the system to be analyzed into a plurality of groups based on the system configuration information 150, the measure-related information 160, and the grouping condition 170 (Step S1). The representative host generation unit 103 generates one or more representative hosts for each group (Step S2). The virtual model generation unit 104 generates a virtual model including the generated representative host (Step S3). Steps S1 to S3 correspond to the virtual model generation method.

The risk analysis unit 105 analyzes the risk in the system to be analyzed using the virtual host generated in Step S3 (Step S4). The user can refer to the risk analysis result to consider measures against the security risk.

In this example embodiment, the grouping unit 102 groups the plurality of hosts into several groups using the measure-related information 160 and the grouping condition 170. The representative host generation unit 103 generates a representative host for each group, and the virtual model generation unit 104 generates a virtual model including the representative host. The risk analysis unit 105 conducts risk analysis using the virtual model including the representative host generated for each group. In this example embodiment, the representative host is generated taking into account the measure-related information 160. The user sets the grouping condition 170 appropriately so that the hosts that can take measures and those that cannot are grouped separately, allowing the representative host generation unit 103 to generate a representative host that properly considers the planned measures.

In this example embodiment, a plurality of hosts are replaced with a representative host to conduct risk analysis. In this way, calculation cost in the risk analysis can be suppressed. In addition, in this example embodiment, while the calculation cost in risk analysis is suppressed, the user can use the results of risk analysis using the representative host to appropriately plan measures.

In FIG. 2, an example in which the risk analysis apparatus 100 includes the virtual model generation apparatus 110 has been described. However, the present disclosure is not limited to this. The risk analysis apparatus 100 and the virtual model generation apparatus 110 need not necessarily be configured as the same apparatus, and they may be configured as separate apparatuses.

Figure 6:
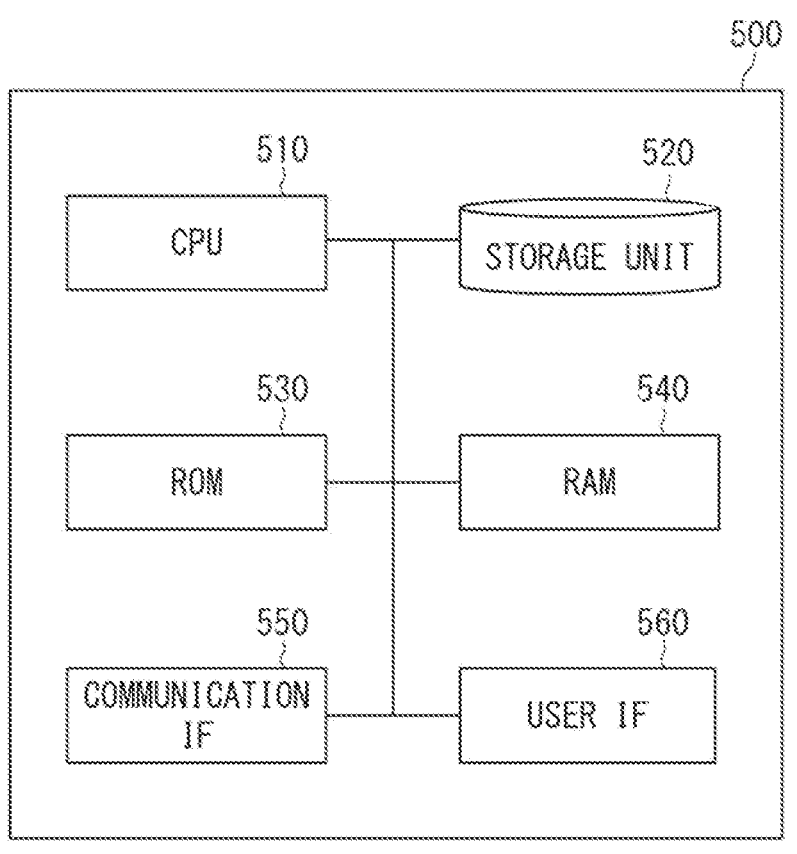
FIG. 6 is a block diagram showing a configuration example of a computer apparatus.

Next, a physical configuration of the risk analysis apparatus will be described. FIG. 6 shows a configuration example of a computer apparatus that can be used as the risk analysis apparatus 100 and the virtual model generation apparatus 110. A computer apparatus 500 includes a control unit (CPU: Central Processing Unit) 510, a storage unit 520, a ROM (Read Only Memory) 530, a RAM (Random Access Memory) 540, a communication interface (IF) 550, and a user interface (IF) 560.

The communication IF 550 is an interface for connecting the computer apparatus 500 to a communication network via wire communication means or wireless communication means. The user IF 560 includes, for example, a display unit such as a display. The user IF 560 also includes an input unit such as a keyboard, a mouse, and a touch panel.

The storage unit 520 is an auxiliary storage apparatus capable of holding various kinds of data. The storage unit 520 need not necessarily be a part of the computer apparatus 500, and may be an external storage device or cloud storage connected to the computer apparatus 500 via a network. The storage unit 520 stores, for example, the system configuration information 150, the measure-related information 160, and the grouping condition 170 shown in FIG. 2.

The ROM 530 is a non-volatile storage device. For the ROM 530, a semiconductor storage device such as a flash memory having a relatively small capacity is used. The program executed by the CPU 510 may be stored in the storage unit 520 or the ROM 530. The storage unit 520 or the ROM 530 may store various programs for implementing the functions of each unit in, for example, the risk analysis apparatus 100 or the virtual model generation apparatus 110.

The above program can be stored and provided to the computer apparatus 500 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD (compact disc) or DVD (digital versatile disk), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The RAM 540 is a volatile storage device. Various semiconductor memory devices such as DRAM (Dynamic Random Access Memory) or SRAM (Static Random Access Memory) are used for the RAM 540. The RAM 540 can be used as an internal buffer for temporarily storing data and so on. The CPU 510 deploys and executes programs stored in the storage unit 520 or the ROM 530 in the RAM 540. When the CPU 510 executes programs, functions of each unit in risk analysis apparatus 100 or the virtual model generation apparatus 110 can be implemented. The CPU 510 may have an internal buffer that can temporarily store data and so on.

Although the example embodiments of the present disclosure have been described in detail above, the present disclosure is not limited to the example embodiments described above, and changes or modifications to the example embodiments are included in the present disclosure to the extent that they do not deviate from the purpose of the present disclosure.

The whole or part of the example embodiments disclosed above can be described as, but not limited to, the following supplementary notes.

[Supplementary Note 1]

A risk analysis apparatus comprising:

grouping means for grouping a plurality of hosts included in a system to be analyzed into a plurality of groups each including one or more hosts using measure-related information including information related to measures planned to address risks included in the system;

virtual analysis element generation means for generating one or more virtual analysis elements for each of the plurality of groups;

virtual model generation means for generating a virtual model used for risk analysis, the virtual model including the generated virtual analysis elements; and analysis means for analyzing the risks included in the system to be analyzed using the virtual model.

[Supplementary Note 2]

The risk analysis apparatus according to supplementary note 1, wherein the measure-related information includes at least one of time information, management information, operation information, or functional performance information.

[Supplementary Note 3]

The risk analysis apparatus according to supplementary note 2, wherein the grouping means groups the plurality of hosts into the plurality of groups further using a grouping condition specifying, from among information included in the measure-related information, information to be used by the grouping means for grouping and a value of the information.

[Supplementary Note 4]

The risk analysis apparatus according to any one of supplementary notes 1 to 3, wherein the grouping means groups the hosts into the plurality of groups further using configuration information about the system.

[Supplementary Note 5]

The risk analysis apparatus according to supplementary note 4, wherein the grouping means groups the hosts into the plurality of groups based on the configuration information in a first stage, and divides at least some of the plurality of groups into the plurality of groups using the measure-related information in a second stage.

[Supplementary Note 6]

The risk analysis apparatus according to any one of supplementary notes 1 to 5, wherein the virtual analysis element generation means generates a representative host that is a virtual host representing the hosts belonging to the group as the virtual analysis element.

[Supplementary Note 7]

The risk analysis apparatus according to supplementary note 6, wherein the virtual analysis element generation means merges attackable elements of the host belonging to the group and uses the merged attackable elements as an attackable element of the representative host.

[Supplementary Note 8]

A virtual model generation apparatus comprising:

grouping means for grouping a plurality of hosts included in a system to be analyzed into a plurality of groups each including one or more hosts using measure-related information including information related to measures planned to address risks included in the system;

virtual analysis element generation means for generating one or more virtual analysis elements for each of the plurality of groups; and virtual model generation means for generating a virtual model used for risk analysis, the virtual model including the generated virtual analysis elements.

[Supplementary Note 9]

The virtual model generation apparatus according to supplementary note 8, wherein the measure-related information includes at least one of time information, management information, operation information, or functional performance information.

[Supplementary Note 10]

The virtual model generation apparatus according to supplementary note 8 or 9, wherein the grouping means groups the hosts into the plurality of groups further using configuration information about the system.

[Supplementary Note 11]

A risk analysis method comprising:

grouping a plurality of hosts included in a system to be analyzed into a plurality of groups each including one or more hosts using measure-related information including information related to measures planned to address risks included in the system;

generating one or more virtual analysis elements for each of the plurality of groups;

generating a virtual model used for risk analysis, the virtual model including the generated virtual analysis elements; and analyzing the risks included in the system to be analyzed using the virtual model.

[Supplementary Note 12]

A virtual model generation method comprising:

grouping a plurality of hosts included in a system to be analyzed into a plurality of groups each including one or more hosts using measure-related information including information related to measures planned to address risks included in the system;

generating one or more virtual analysis elements for each of the plurality of groups; and generating a virtual model used for risk analysis, the virtual model including the generated virtual analysis elements.

[Supplementary Note 13]

A non-transitory computer readable medium storing a program for causing a computer to execute processing of:

grouping a plurality of hosts included in a system to be analyzed into a plurality of groups each including one or more hosts using measure-related information including information related to measures planned to address risks included in the system;

generating one or more virtual analysis elements for each of the plurality of groups;

generating a virtual model used for risk analysis, the virtual model including the generated virtual analysis elements; and analyzing the risks included in the system to be analyzed using the virtual model.

[Supplementary Note 14]

A non-transitory computer readable medium storing a program for causing a computer to execute processing of:

grouping a plurality of hosts included in a system to be analyzed into a plurality of groups each including one or more hosts using measure-related information including information related to measures planned to address risks included in the system;

generating one or more virtual analysis elements for each of the plurality of groups; and generating a virtual model used for risk analysis, the virtual model including the generated virtual analysis elements.

REFERENCE SIGNS LIST

10: RISK ANALYSIS APPARATUS
11: GROUPING MEANS
12: VIRTUAL ANALYSIS ELEMENT GENERATION MEANS
13: VIRTUAL MODEL GENERATION MEANS
14: ANALYSIS MEANS
20: VIRTUAL MODEL GENERATION APPARATUS
100: RISK ANALYSIS APPARATUS
101: CONFIGURATION INFORMATION ACQUISITION UNIT
102: GROUPING UNIT
103: REPRESENTATIVE HOST GENERATION UNIT
104: VIRTUAL MODEL GENERATION UNIT
105: RISK ANALYSIS UNIT
110: VIRTUAL MODEL GENERATION APPARATUS
150: SYSTEM CONFIGURATION INFORMATION
160: MEASURE-RELATED INFORMATION
170: GROUPING CONDITION
201: OFFICE PC
202, 203: HOST
204: SERVER
205: REPRESENTATIVE HOST
211, 212: NETWORK SWITCH
500: COMPUTER APPARATUS
510: CPU
520: STORAGE UNIT
530: ROM
540: RAM
550: COMMUNICATION IF
560: USER IF

What is claimed is:

1. A risk analysis apparatus comprising:
a memory storing instructions; and
a processor configured to execute the instructions to:
group a plurality of hosts included in a system to be analyzed into a plurality of groups each including one or more hosts using countermeasure-related information including information related to countermeasures planned to address risks included in the system;
generate one or more virtual analysis elements for each of the plurality of groups;
generate a virtual model used for risk analysis, the virtual model including the generated virtual analysis elements; and analyze the risks included in the system to be analyzed using the virtual model, wherein the countermeasure-related information includes at least one of time information, management information, operation information, or functional performance information, and wherein the time information includes at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

2. The risk analysis apparatus according to claim 1, wherein the processor is configured to execute the instructions to group the plurality of hosts into the plurality of groups further using a grouping condition specifying, from among information included in the countermeasure-related information, information to be used for grouping and a value of the information.

3. The risk analysis apparatus according to claim 1, wherein the processor is configured to execute the instructions to group the hosts into the plurality of groups further using configuration information about the system.

4. The risk analysis apparatus according to claim 3, wherein the processor is configured to execute the instructions to group the hosts into the plurality of groups based on the configuration information in a first stage, and divide at least some of the plurality of groups into the plurality of groups using the countermeasure-related information in a second stage.

5. The risk analysis apparatus according to claim 1, wherein the processor is configured to execute the instructions to generate a representative host that is a virtual host representing the hosts belonging to the group as the virtual analysis element.

6. The risk analysis apparatus according to claim 5, wherein the processor is configured to execute the instructions to merge attackable elements of the host belonging to the group and use the merged attackable elements as an attackable element of the representative host.

7. A virtual model generation apparatus comprising:
a memory storing instructions; and
a processor configured to execute the instructions to:
group a plurality of hosts included in a system to be analyzed into a plurality of groups each including one or more hosts using countermeasure-related information including information related to countermeasures planned to address risks included in the system;
generate one or more virtual analysis elements for each of the plurality of groups; and
generate a virtual model used for risk analysis, the virtual model including the generated virtual analysis elements, wherein the countermeasure-related information includes at least one of time information, management information, operation information, or functional performance information, and

wherein the time information including at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

8. The virtual model generation apparatus according to claim 7, wherein the processor is configured to execute the instructions to group the hosts into the plurality of groups further using configuration information about the system.

9. A risk analysis method comprising:
grouping a plurality of hosts included in a system to be analyzed into a plurality of groups each including one or more hosts using countermeasure-related information including information related to countermeasures planned to address risks included in the system;
generating one or more virtual analysis elements for each of the plurality of groups;
generating a virtual model used for risk analysis, the virtual model including the generated virtual analysis elements; and
analyzing the risks included in the system to be analyzed using the virtual model,
wherein the countermeasure-related information includes at least one of time information, management information, operation information, or functional performance information, and
wherein the time information includes at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

10. A virtual model generation method comprising:
grouping a plurality of hosts included in a system to be analyzed into a plurality of groups each including one or more hosts using countermeasure-related information including information related to countermeasures planned to address risks included in the system;
generating one or more virtual analysis elements for each of the plurality of groups; and
generating a virtual model used for risk analysis, the virtual model including the generated virtual analysis elements,
wherein the countermeasure-related information includes at least one of time information, management information, operation information, or functional performance information, and

wherein the time information includes at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

11. A non-transitory computer readable medium storing a program for causing a computer to execute processing comprising:
grouping a plurality of hosts included in a system to be analyzed into a plurality of groups each including one or more hosts using countermeasure-related information including information related to countermeasures planned to address risks included in the system;
generating one or more virtual analysis elements for each of the plurality of groups;
generating a virtual model used for risk analysis, the virtual model including the generated virtual analysis elements; and
analyzing the risks included in the system to be analyzed using the virtual model,
wherein the countermeasure-related information includes at least one of time information, management information, operation information, or functional performance information, and
wherein the time information includes at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

12. A non-transitory computer readable medium storing a program for causing a computer to execute processing comprising:
grouping a plurality of hosts included in a system to be analyzed into a plurality of groups each including one or more hosts using countermeasure-related information including information related to countermeasures planned to address risks included in the system;
generating one or more virtual analysis elements for each of the plurality of groups; and
generating a virtual model used for risk analysis, the virtual model including the generated virtual analysis elements,
wherein the countermeasure-related information includes at least one of time information, management information, operation information, or functional performance information, and wherein the time information includes at least one of an operating time of the host, a frequency of countermeasures, and a time required for countermeasures, the management information including at least one of information about a vendor, a management department, and a location where the host is installed, the operation information including at least one of information related to whether or not administrator privileges can be disabled and whether or not USB memory devices can be used, the functional performance information including information about an available capacity of storage devices, a memory capacity, a central processing unit (CPU) performance, a maintenance support expiration date for an OS or software, and an availability of rack space.

\* \* \* \* \*